(No Model.)
W. V. EVANS & E. MOORE.
Combined Cotton Seed and Corn Planter.
No. 239,038. Patented March 22, 1881.
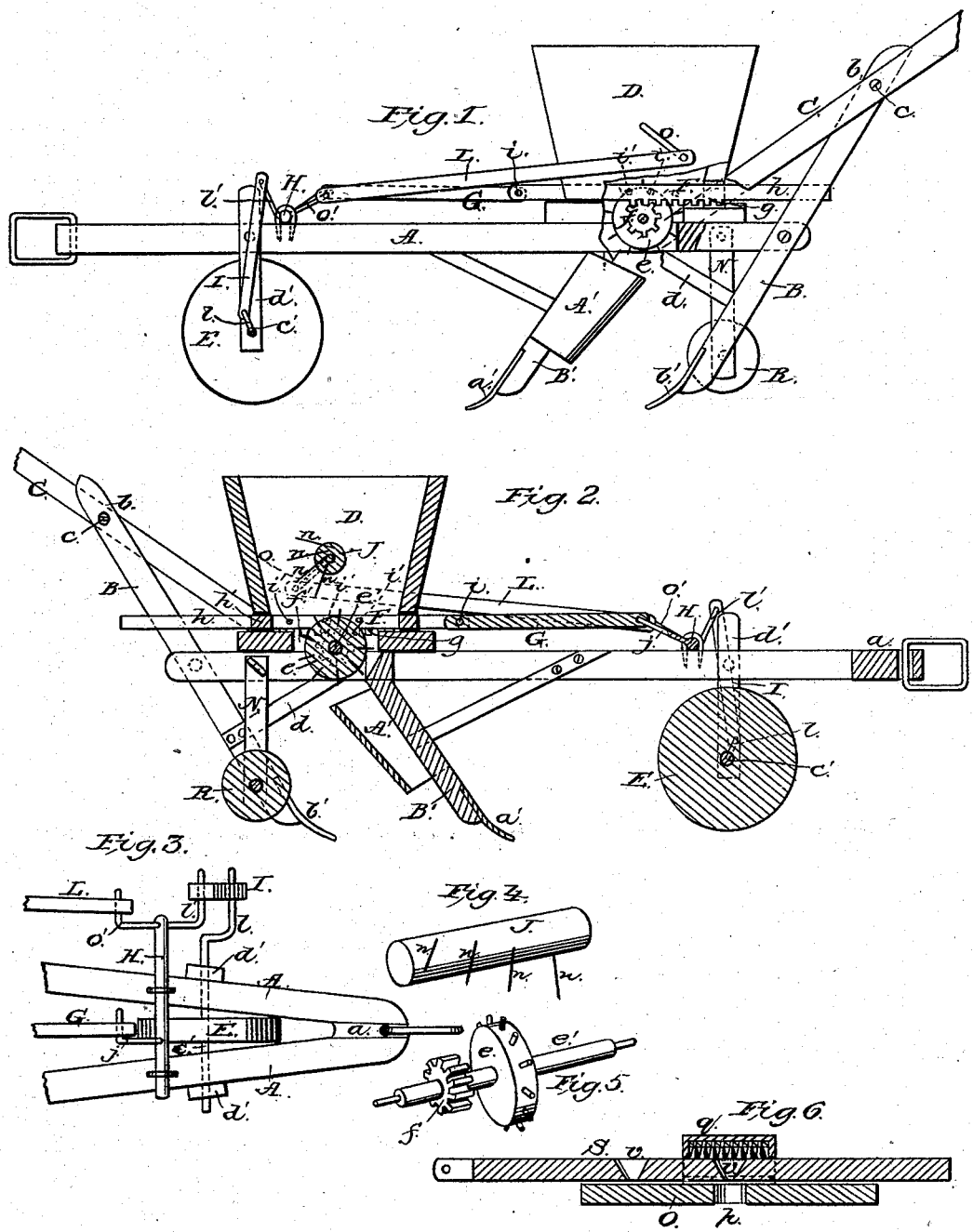
WITNESSES
INVENTORS
Wm V. Evans,
Edgar Moore,
by E. W. Anderson
their ATTORNEY

UNITED STATES PATENT OFFICE.

WILLIAM V. EVANS AND EDGAR MOORE, OF DALLAS, TEXAS.

COMBINED COTTON-SEED AND CORN PLANTER.

SPECIFICATION forming part of Letters Patent No. 239,038, dated March 22, 1881.

Application filed July 24, 1880. (No model.)

*To all whom it may concern:*

Be it known that we, WM. V. EVANS and EDGAR MOORE, of Dallas, in the county of Dallas and State of Texas, have invented a new and valuable Improvement in Combined Cotton-Seed and Corn Planters; and we do hereby declare that the following is a full, clear, and exact description of the construction and operation of the same, reference being had to the annexed drawings, making a part of this specification, and to the letters and figures of reference marked thereon.

Figure 1 of the drawings is a representation of a side view of our improved planter, partly broken away. Fig. 2 is a longitudinal section of the same; and Figs. 3, 4, 5, and 6 are details.

This invention has relation to improvements in machines for planting corn and cotton-seed; and it consists in a planter constructed and operated substantially as hereinafter set forth.

In the annexed drawings, the letter A designates the two diverging side bars or rails, connected together in front by a clevis or draft-block, $a$, and carrying at their rear ends the cultivating-shovel standards B, the upper ends, $b$, of which are connected to the operating-handles C by the brace $c$. These standards are braced to the bars A by means of the metallic plate $d$.

D indicates the hopper, secured to the side bars in any suitable manner, somewhat in front of the standards B, and discharging into a spout, A′, attached to the rear edge of the standard B′, that carries the furrow-opening shovel $a'$ on its lower end. This shovel cuts the furrow, and those $b'$ of the standards throw earth in upon the seed dropped into the same.

E indicates a wheel applied upon a crank-shaft, $c'$, having its bearings in two hangers, $d'$, depending from the front part of the rails A, and vertically adjustable relative thereto, for the purpose of regulating the penetration of the furrow-opener.

$e$ indicates a radially-spurred wheel applied upon a shaft, $e'$, having its bearings in the bottom of the hopper, and provided with a small pinion, $f$. The wheel $e$ works through a slot, $f'$, in the bottom of the hopper, and derives an oscillating motion from the transporting-wheel E through the medium of an endwise-reciprocating slide, F, having on its under side a rack-bar, $g$, that engages the pinion $f$ aforesaid. This slide is composed of two bars, $h$, arranged parallel to each other and extending front and rear through the hopper. The bars are kept apart, so as not to bind upon the feed-wheel, by a removable spacing-block, $h'$, and their front ends are connected, by a through-pin, $i$, to a pitman, G, applied to a wrist upon an arm, $j$, extending upward from a rock-shaft, H, having its bearings in the rails A and arranged transversely of the machine. The shaft H derives motion from the shaft $c'$ through the medium of a pitman, I, applied to a crank-arm, $l$, on the shaft $c'$, and a similar arm, $l'$, on the shaft H, the arm $l'$ being in a plane at right angles to the arm $j$. The turning over of the wheel imparts a to-and-fro movement to the feed-wheel $e$, and its spurs thus act alternately to push the seed through the slot $f'$ at opposite ends of the same, and at the same time to prevent them from clogging the said slot. The seeds are fed to wheel $e$ faster or slower, according as the spurs $i'$, arranged on the bars $h$, are turned toward or from the feed-wheel. Above the feed-wheel, and arranged parallel thereto, is a drum or other equivalent device, J, having a number of spirally-arranged teeth, $n$. This drum is provided on one of its journals with a crank-arm, $o$, that is connected to a crank-arm, $o'$, on the rock-shaft H by means of the pitman L. This crank $o'$ is parallel to the crank $j$, and imparts to the drum a rocking motion, which, by means of the teeth, lightens up the seed and prevents it from packing in the hopper. R indicates a crushing-roller, having its bearings in the hangers N, removably secured to the frame of the machine. It works just behind the covering-shovels, and when the earth thrown up thereby is lumpy reduces the clods to powder and renders the soil light and mellow. When this condition of the soil does not exist the roller may be removed.

This device is especially designed for seeding cotton; but the machine is converted into a corn-planter by detaching the bottom of the hopper, removing the spacing-block $h'$, disconnecting the pitman, and then removing the slide, and substituting in lieu thereof a device (shown in Fig. 6) composed of a bottom, O, having a seed-opening, $p$, and a bridge-form metallic striker, $q$, arranged across the same, and a dropper-slide, S, having dropper-holes $v$, arranged at each side of said bridge, and brought, by the reciprocation of the slide, alternately in line with the seed-opening $p$. This slide is coupled to the pitman G, and the bridge provided with brushes which strike off the excess of seed in the holes $v$.

What we claim as new, and desire to secure by Letters Patent, is—

The combination, with the hopper D, having the shaft $e'$, the oscillating spurred feed-wheel $e$, working through a slot, $f'$, and a pinion, $f$, on said shaft, of the slotted endwise-reciprocating slide F, its rack-bar $g$, engaging the said pinion, the spirally-spurred drum J, having the crank $o$, the rock-shaft H, having the crank-arms $j$ $l'$ $o'$, the pitmen G L I, and the wheel E, having the crank $l$, substantially as specified.

In testimony that we claim the above we have hereunto subscribed our names in the presence of two witnesses.

WILLIAM V. EVANS.
EDGAR MOORE.

Witnesses:
H. BARKSDALE,
A. T. OBENCHAIN.